United States Patent
Yoo

[11] Patent Number: 5,816,520
[45] Date of Patent: Oct. 6, 1998

[54] REEL BRAKE APPARATUS FOR A VCR

[75] Inventor: Hyo-Jong Yoo, Kyunggi-Do, Rep. of Korea

[73] Assignee: Daewoo Electronics Co., Ltd., Rep. of Korea

[21] Appl. No.: 845,419

[22] Filed: Apr. 25, 1997

[30] Foreign Application Priority Data

Apr. 25, 1996 [KR] Rep. of Korea .................. 1996-12776

[51] Int. Cl.⁶ .................................................. G03B 1/04
[52] U.S. Cl. ...................................... 242/338.3; 360/96.3
[58] Field of Search .............................. 242/338.3, 343, 242/355.1, 356.4; 360/96.3, 132

[56] References Cited

U.S. PATENT DOCUMENTS

| | | | |
|---|---|---|---|
| 4,106,724 | 8/1978 | Higashida | 242/338.3 |
| 4,232,840 | 11/1980 | Sugawara | 242/338.3 |
| 4,447,020 | 5/1984 | Toi et al. | 242/338.3 |
| 4,623,105 | 11/1986 | Pertzsch et al. | 242/338.3 |
| 4,648,565 | 3/1987 | Maehara | 242/338.3 |
| 4,991,448 | 2/1991 | Hayashi | 73/862.52 |
| 5,146,380 | 9/1992 | Fujii | 360/132 |
| 5,358,195 | 10/1994 | Kang | 242/343.1 |

FOREIGN PATENT DOCUMENTS 0 450 976   10/1991   European Pat. Off. .

*Primary Examiner*—Chris Schwartz
*Attorney, Agent, or Firm*—Cushman Darby & Cushman Intellectual Property Group of Pillsbury Madison & Sutro, LLP

[57] ABSTRACT

The reel brake apparatus for a VCR has a releasing shaft and a mode plate for driving the releasing shaft. The releasing shaft is movably mounted on a main base, and the mode plate has a recess part which is recessed from a plane part thereof. The mode plate is movably disposed along a planar direction thereof. When a cassette is loaded in the VCR, the releasing shaft is inserted into the cassette. A locking device in the cassette is driven by the inserted releasing shaft, so reel hubs in the cassette are released. If the operating mode of the VCR is converted to a stop mode or an eject mode during the running of the tape, the mode plate is moved so that the releasing shaft may be accommodated in the recess part. Accordingly, the releasing shaft is detached from the cassette to lock the reel hubs.

5 Claims, 4 Drawing Sheets

REEL BRAKE APPARATUS FOR A VCR

BACKGROUND OF THE INVENTION

1. Field of the Invention

The present invention relates to a reel brake apparatus for a VCR, and more particularly to a reel brake apparatus to stop running of a tape when the operating mode of a VCR is converted from a running mode to a stop mode or an eject mode.

2. Prior Art

A VCR is an appliance for recording image signals or reproducing recorded signals in a magnetic tape, which has, as shown in FIG. 1, a running system for running a tape T along a predetermined path, and a supply reel 22 and a winding reel 21 for supporting a cassette C and driving the tape T in a desired direction. The running system comprises a head drum 13 for reproducing recorded signals, a sound reproducing head 15 for reproducing sound signals, and a capstan motor 10 for running the tape T with the help of a pinch roller 11.

Between the supply reel 22 and the winding reel 21, a reel driving apparatus 30 is installed for transmitting power from the capstan motor 10 to a reel which is selected out of the supply reel 22 and the winding reel 21. The reel driving apparatus 30 has a reel gear 31 which is rotated by the capstan motor 10, and an idle gear 32 which is rotated by the reel gear 31. The shaft of the reel gear 31 and the shaft of the idle gear 32 are connected with each other by an idle plate 33. The idle gear 32 pivots on the shaft of the reel gear 31 by the idle plate 33, and thus the idle gear 32 is selectively engaged with the supply reel 22 or the winding reel 21 by the pivoting of the idle gear 32. Accordingly, the engaged reel is rotated by the capstan motor 10.

The cassette C has, as shown in FIGS. 2 and 3, a supply reel hub 42 and a winding reel hub 41 which are installed in a case 45 and wind the tape T respectively, and a locking device 50 for limiting or allowing the rotation of the supply reel hub 42 and the winding reel hub 41. The locking device 50 comprises a driving member 51 and a latch member 55. As shown in FIG. 3, the driving member 51 has an operating lever 52 and a driving lever 53 which are extended substantially in a vertical direction from each other, and the driving member 51 is pivotably fixed by a hinge 54. The latch member 55 has a driving pin 57 which is driven by the driving lever 53 of the driving member 51 and a braking pin 58 which is engaged with gear parts of each reel hub 41, 42, and the latch member 55 is pivotably fixed by a supporting shaft 56. A torsion spring 59 is installed on the supporting shaft 56 in order to give an elastic force to the latch member 55. The braking pin 58 is maintained in an engaged state with the reel hubs 41, 42 by the elastic force of the torsion spring 59, and accordingly the latch member 55 maintains a normal locking state by limiting the rotation of the reel hubs 41, 42 in a normal state. In that situation, the latch member 55 limits the rotation in one direction which unwinds the tape T and allows the rotation in the other direction which winds the tape T from the supply reel hub 42 and the winding reel hub 41.

On the main base B, a releasing shaft 60 for releasing the locking by the locking device 50 is mounted, and an entrance hole 47 for allowing the entrance of the releasing shaft 60 into the cassette C is formed on the case 45 of the cassette C. When the cassette C is loaded on the main base B, the releasing shaft 60 is inserted into the cassette C through the entrance hole 47. At that situation, the releasing shaft 60 pushes the operating lever 52 of the driving member 51, and accordingly the driving member 51 pivots on the hinge 54. The driving lever 53 of the driving member 51 pushes the driving pin 57 of the latch member 55, and accordingly the braking pin 58 is disengaged with the gear parts of each reel hub 41, 42. Thus, if the cassette C is loaded on the main base B, the locking of the reel hubs 41, 42 is released. If the cassette C is unloaded from the main base B, the releasing shaft 60 is detached from the cassette C, and the latch member 55 locks the reel hubs 41, 42 again by the elastic force of the torsion spring 59.

The operating modes of a VCR consists of a direct mode for winding the tape T at a high speed, a slip mode for reproducing the contents in the tape T, and a stop mode which stops running of the tape T. The conversion between the direct mode and the slip mode is performed by the reel driving apparatus 30. That is, the rotation of the capstan motor 10 is transmitted to each reel 21, 22 after being varied in rotational velocity by the reel driving apparatus 30 according to the operating modes of the VCR. Furthermore, the direct mode consists of, according to the rotational direction, a FF (forward fast) mode and a RF (reverse fast) mode, and the slip mode consists of, according to the rotational direction, a play mode and a rewind mode. The rotational direction is, as described above, determined by the selection of the reel which is engaged with the idle gear 32. A microprocessor (not shown) in the VCR controls the reel driving apparatus 30 so as to carry out the conversion among each running mode, stop mode, and eject mode.

In the VCR, a reel brake apparatus 35 is provided for limiting the rotation of the reels 21, 22. The reel brake apparatus 35 comprises main brakes 36, band brakes 38, and sub-brakes 37. The main brakes 36 are engaged with the gear parts of each reel 21, 22 for limiting the rotation of the reels 21, 22, and the band brakes 38 and the sub-brakes 37 are brought into contact with a brake drum which is provided on the periphery of the reels 21, 22 for limiting the rotation of the reels 21, 22. Each brake 36, 37, 38 is driven by the springs 36a which give electric force thereto, and a mode plate (not shown) disposed under the main base B. That is, if the operating mode of the VCR is converted from the running mode of the tape T to the stop mode or the eject mode, the mode plate is moved by a loading motor (not shown) toward a position which corresponds to the converted mode, and accordingly each brake 36, 37, 38 comes in contact with the reels 21, 22 by the elastic force of the springs 36a in order to limit the rotation of the reels 21, 22. Thus, the excessive rotation of the reel hubs 41, 42 by the rotational inertia of the reels 21, 22 is limited, by which the loosening of the tape T out of the reel hubs 41, 42 is limited.

However, since such a conventional reel brake apparatus 35 of the VCR should have a plurality of brakes 36, 37, 38 for limiting the rotation of the supply reel 22 and winding reel 21 respectively and a plurality of accessories and springs 36a for fitting the brakes 36, 37, 38 on the main base B and giving elastic force respectively, the number of the accessories increases and the structure thereof is too complex. Also, due to such a complexity, the assembling process of the VCR becomes complex and malfunctioning may happen frequently. Particularly, since springs 36a having great tension are adopted in order to give the limiting force to each reel 21, 22 sufficiently, a malfunction in operation may happen frequently due to the increasing load, and due to the abrasion by friction between the brakes 36, 37, 38 and the reels 21, 22, proper operation cannot be expected when it is used for a long time.

SUMMARY OF THE INVENTION

The present invention has been proposed to overcome the above described problems in the prior art, and accordingly it is the object of the present invention to provide a reel brake apparatus for a VCR which has a simple structure and may have only slight complications.

To achieve the above object, the present invention provides a reel brake apparatus for a VCR comprising: a releasing shaft mounted on a main base, the releasing shaft being movable along a longitudinal direction thereof; and a means for moving the releasing shaft, wherein the releasing shaft controls locking and releasing operation of a locking device in a cassette loaded on the main base according to a moved position by the moving means.

Here, the moving means comprises a plate being movable along a planar direction thereof, the plate having a plane part disposed parallel with the main base and being formed with a recess part recessed to the longitudinal direction of said releasing shaft, and it is preferable that the moving means further comprises a spring member for elastically supporting the releasing shaft so that an end of the releasing shaft may be urged to come in contact with the plate.

Also, the plate is a mode plate which controls operating modes of the VCR, by which it is possible to get rapid locking and releasing operations according to the conversion of the operating mode of the VCR.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
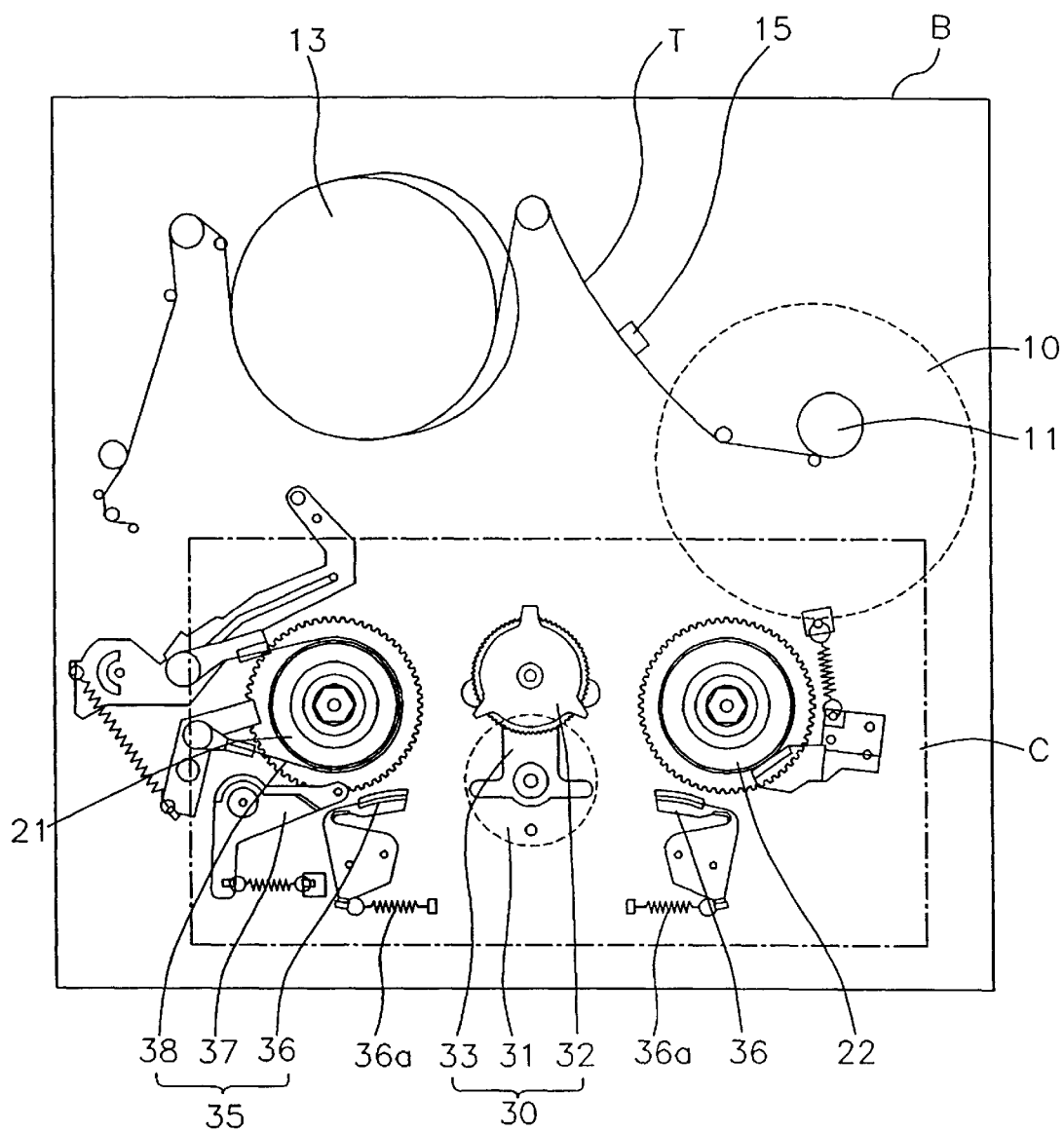
FIG. 1 is a schematic view of a general VCR deck.
Figure 2:
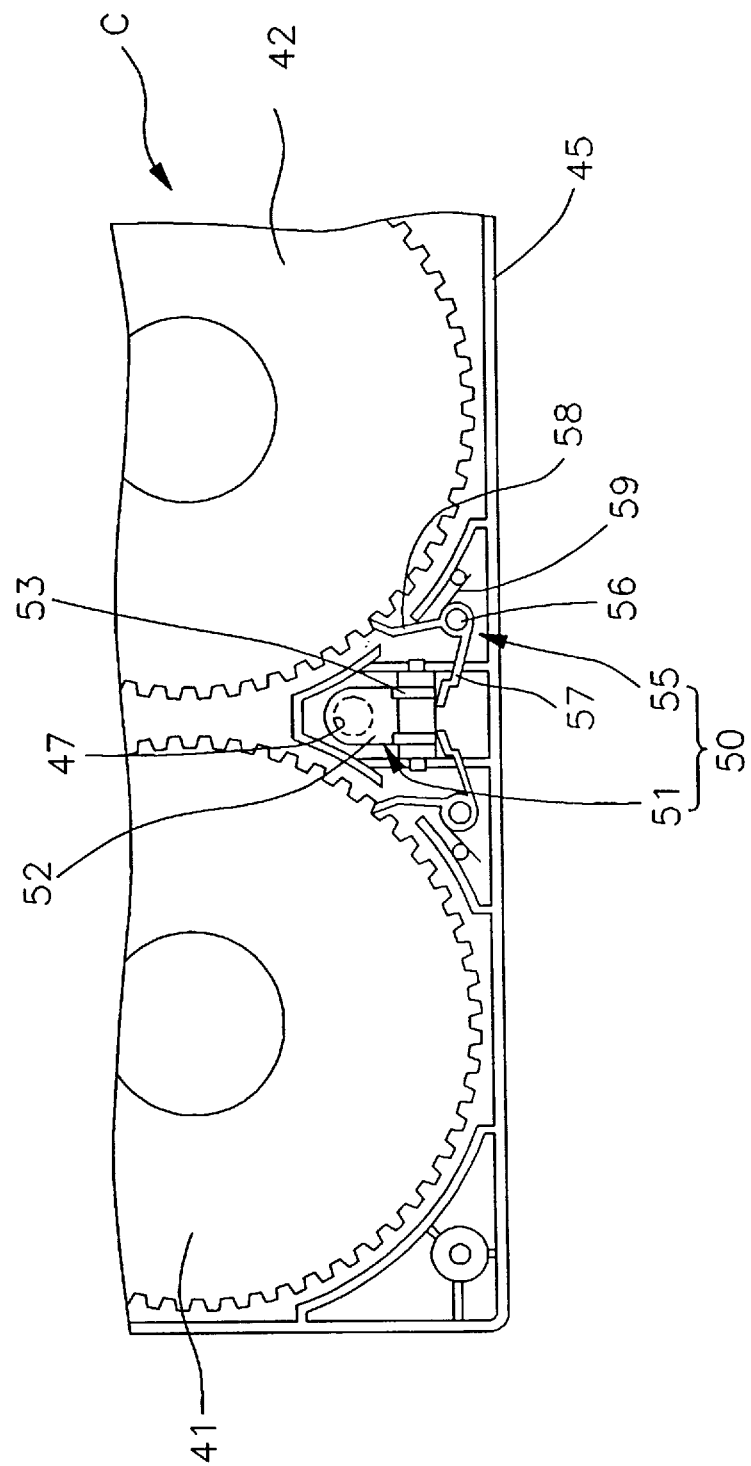
FIG. 2 is a partial transverse sectional view of a cassette having a typical reel hub locking device.
Figure 3:
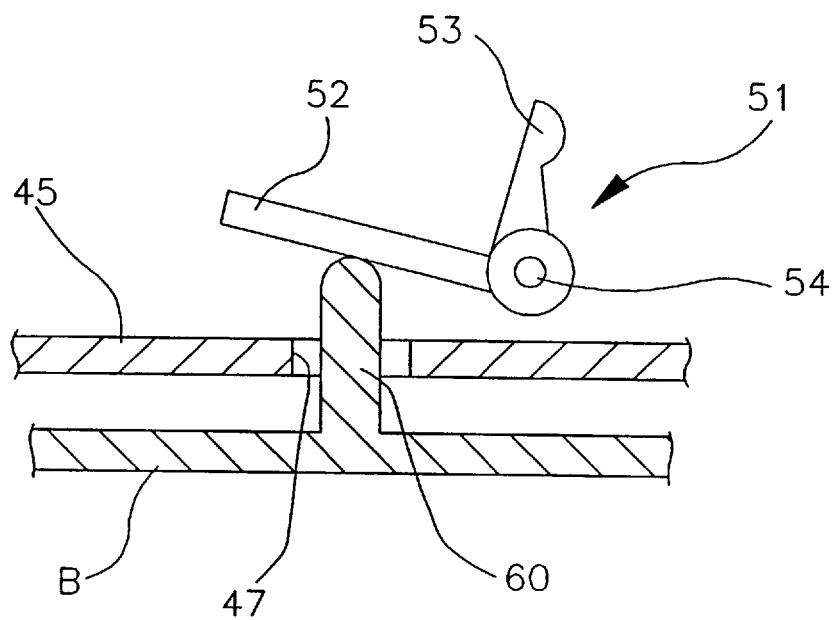
FIG. 3 is a schematic partial vertical sectional view of the VCR, in which the cassette shown in FIG. 2 is loaded on the VCR deck.

Hereinafter, the present invention will be described in detail with reference to the drawings. The present invention will also be illustrated with reference to the conventional VCR shown in FIG. 1 through FIG. 3, and the description of the same parts with the conventional VCR will be omitted. The same parts with the parts of the conventional VCR will be given with the same reference numerals.

Figure 4:
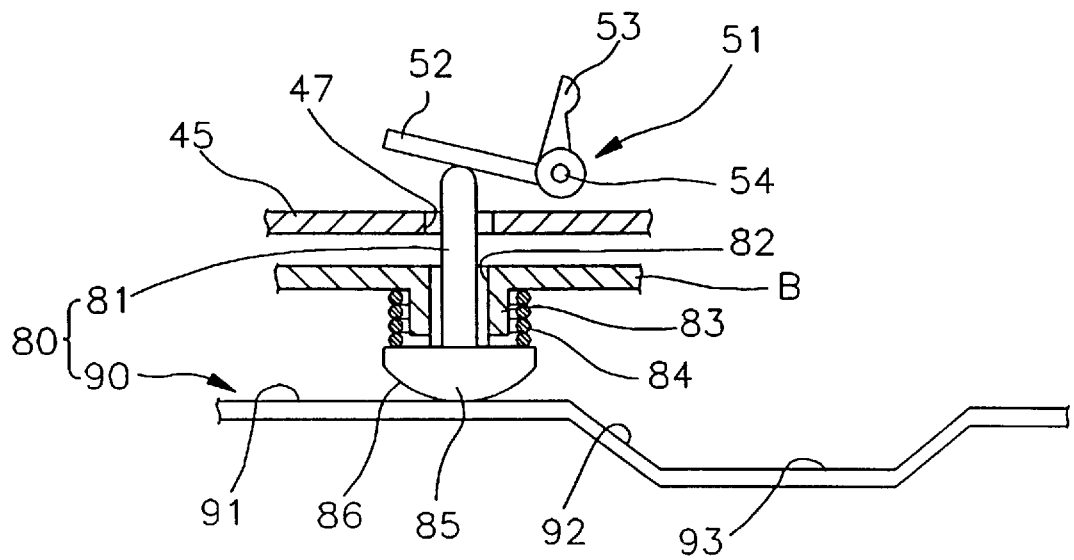
FIG. 4 is a partial vertical sectional view of a VCR according to the present invention, in which a reel brake apparatus is in a released state thereof.
Figure 5:
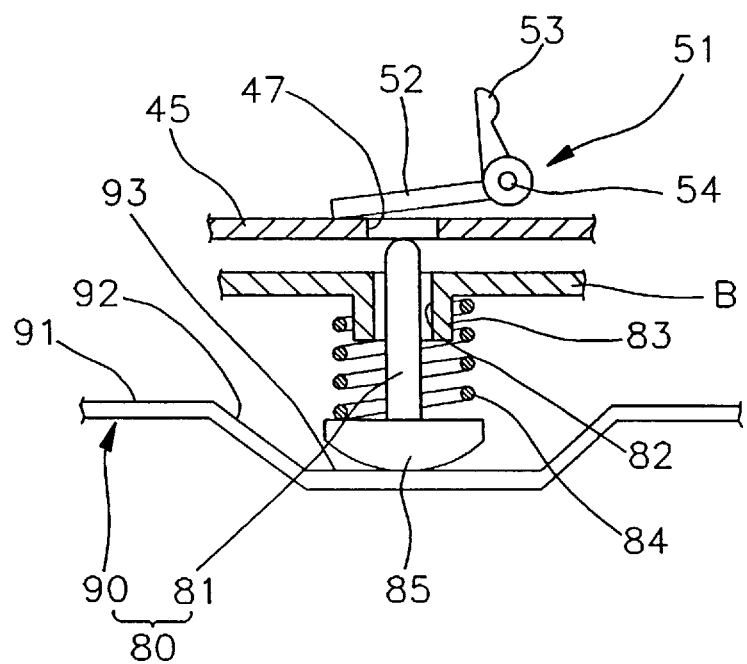
FIG. 5 is a partial vertical sectional view of a VCR according to the present invention, in which a reel brake apparatus is in a locked state thereof.

FIGS. 4 and 5 are partial vertical sectional views of a VCR according to the present invention, which show a reel brake apparatus in a locked state and a released state thereof respectively. The reel brake apparatus 80 according to the present invention has a releasing shaft 81 mounted on the main base B and a mode plate 90 for driving the releasing shaft 90. The main base B is formed with a through-hole 82, and the releasing shaft 81 passes through the through-hole 82 at a right angle in substance against the mode plate 90. On the edge of the through-hole 82, a flange 83 for supporting the releasing shaft 81 is extended. The mode plate 90 has a plane part 91 being disposed parallel with the main base B and a recess part 93 being recessed from the plane part 91. The connecting surface 92 which connects a bottom surface of the recess part 93 with the plane part 91 is a tilted surface which is tilted downward from the plane part 91. The mode plate 90 is mounted movably along the planar directional thereof, and is driven by a loading motor (not shown). The mode plate 90 functions to convert other parts of the VCR which need conversions into corresponding states according to the conversions of the operating modes of the VCR, and functions to drive the releasing shaft 81 so as to control the reel brake apparatus 80.

A sliding member 85 is fixed at the lower end of the releasing shaft 85, and a coil spring 84 is disposed between the sliding member 85 and the main base B. The coil spring 84 urges the sliding member 85 downward, by which the lower end of the sliding member 85 comes into elastic contact with the upper surface of the mode plate 90. The lower part of the sliding member 85 is formed to have a spherical surface 86 so that the releasing shaft 81 may move easily along the connecting surface 92 between the plane part 91 and the recess part 93 when the mode plate 90 moves.

Hereinbelow, the operation of the reel brake apparatus of the VCR according to the present invention and the effect thereby will be described.

During a normal state, as shown in FIG. 4, the mode plate 90 lies at the position that the sliding member 85 is in contact with the plane part 91, and accordingly the upper end of the releasing shaft 81 protrudes toward the upper side of the main base B. When the cassette C is loaded on the main base B, the releasing shaft 81 is inserted into the cassette C through the entrance hole 81 of the cassette C, and the releasing shaft 81 pushes the operating lever 52 of the driving member 51, by which the driving member 51 pivots. The latch member 55 pivots by the driving member 51, so the reel hubs 41, 42 are released.

In such a state, if the operating mode of the VCR is converted to the play mode, rewind mode, FF mode, or RF mode, the reel brake apparatus 80 is driven according to the converted mode, and the capstan motor 10 begins to run the tape T. If the operating mode is converted to the stop mode or the eject mode during the running of the tape T, the mode plate 90 is moved by the loading motor, so the recess part 93 is located under the releasing shaft 81.

Thus, as shown in FIG. 5, the lower part of the releasing shaft 81 is accommodated in the recess part 93. During that situation, the releasing shaft 81 moves downward by the elastic force of the coil spring 84 to be detached from the cassette C. The driving member 51 and the latch member 55 are restored to their initial state by the elastic force of the torsion spring 59, and accordingly the reel hubs 41, 42 are locked by the latch member 55. Thus, the reel hubs 41, 42 stop rotating, and the unwinding of the tape T is prevented.

If the operating mode is converted from the stopped state of the tape T to the running mode of the tape T, the mode plate 90 is restored to the state as shown in FIG. 4 by the loading motor. Accordingly, the releasing shaft 81 releases the reel hubs 41, 42 again. At that situation, since the connecting surface 92 is the tilted surface and the lower surface of the sliding member 85 is the spherical surface 86, the releasing shaft 81 can move easily from the recess part 93 to the plane part 91.

As mentioned above, since the locking and releasing of the reel hubs 41, 42 in the cassette C are carried out by the releasing shaft 81, the stopping of the reel hubs 41, 42 is swiftly performed without the extra reel brake apparatus for limiting the rotation of the supply reel 22 and the winding reel 21. Also, since the driving of the releasing shaft 81 is performed by the mode plate 90 which controls the overall operation of the VCR, the locking and releasing according to the operating modes of the VCR is exactly carried out without the extra device for sensing the operating modes of the VCR.

In this embodiment, the coil spring 84 has been adopted to give the elastic force to the releasing shaft 81, however, since the releasing shaft 81 may move downward not only by the elastic force of the coil spring 84 but also by the releasing shaft's own weight and by the torsion spring 59 which gives the elastic force to the latch member 55 when the releasing shaft 81 is located at the recess part 93, it is possible to achieve almost the same effect without the coil spring 84.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A reel brake apparatus for a VCR comprising:

a releasing shaft mounted on a main base, said releasing shaft being movable along a longitudinal direction thereof; and a plate being movable along a planar direction thereof, said plate having a plane part disposed parallel with said main base and having a recessed part in the longitudinal direction of said releasing shaft;

wherein said releasing shaft controls a locking and releasing operation of a locking device in a cassette loaded on said main base according to a moved position by said plate.

2. The reel brake apparatus as claimed in claim 1, wherein said apparatus further comprises a spring member for elastically supporting said releasing shaft so that an end of said releasing shaft may be forced to come in contact with said plate.

3. The reel brake apparatus as claimed in claim 2, wherein a connecting surface which connects a bottom surface of said recess part with said plane part is a tilted surface from the planar direction.

4. The reel brake apparatus as claimed in claim 3, further comprising a sliding member fixed on the end of said releasing shaft, wherein a surface of said sliding member being in contact with said plate is a spherical surface.

5. The reel brake apparatus as claimed in claim 1, wherein said plate is a mode plate to control operating modes of the VCR.

* * * * *